June 15, 1926.  E. MITCHELL  1,589,208
MEAT TENDERER
Filed Jan. 21, 1926
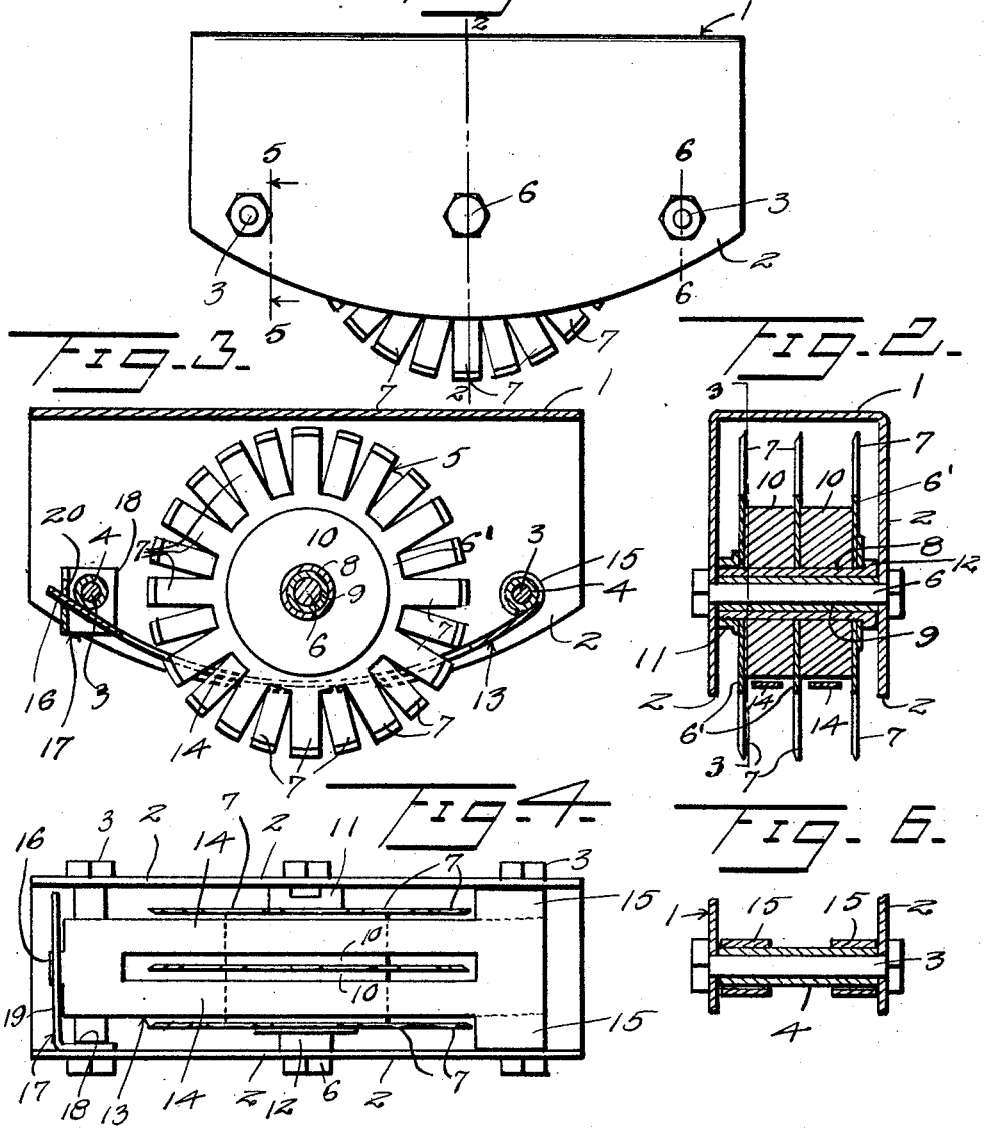

Patented June 15, 1926.

1,589,208

UNITED STATES PATENT OFFICE.

EVERT MITCHELL, OF LAWRENCE, KANSAS.

MEAT TENDERER.

Application filed January 21, 1926. Serial No. 82,774.

This invention relates to meat tenderers, and has for one of its objects the provision of a novel device of this character that can be easily and effectively manipulated, that shall be practically indestructible, and can be manufactured and sold at a comparatively low cost.

With the foregoing and other objects in view, the invention consists of the novel construction, combination and arrangement of parts hereinafter fully described and claimed, and illustrated in the accompanying drawing, wherein:

Figure 1 is a view in side elevation of a meat tenderer constructed in accordance with my invention.

Figure 2 is a transverse sectional view taken on the plane indicated by the line 2—2 of Figure 1, Figure 3 is a longitudinal sectional view taken on the plane indicated by the line 3—3 of Figure 2, Figure 4 is a bottom plan view of the meat tenderer, Figure 5 is a detail sectional view taken on the plane indicated by the line 5—5 of Figure 1, and Figure 6 is a similar view taken on the plane indicated by the line 6—6 of Figure 1.

Corresponding and like parts are referred to in the following description, and designated in the several views of the accompanying, by similar reference characters.

The meat tenderer comprises a hollow body 1 which is fully open at its ends and bottom and adapted to be used as a handle during the manipulation of the device. The bottom edges 2 of the sides of the body 1 are of arcuate formation and extend upwardly and outwardly from the vertical center of the body. The body 1 is preferably made of sheet metal, and the sides thereof are maintained in parallel relation by end bolts 3 and spacing sleeves 4. The bolts 3 are located adjacent the bottom edges of the sides of the body 1, and the sleeves 4 are mounted upon said bolts between the sides.

A cutter 5 is rotatably supported within the body 1 by a bolt 6 which extends across the body at a point centrally between the ends thereof. This part comprises metal disks 6' which are provided at their peripheries with radially extending knives 7. The disks 6' are mounted upon a hub 8 in which is mounted a bushing 9, and they are relatively spaced and maintained in such relation by members 10. The disks 6' and members 10 are secured in assembled relation on the hub 9 by a nut 11 having threaded engagement with one end of the hub and a head 12 at the other end of the hub. The hub 8 extends beyond the two outer disks 6 and contacts with the inner surfaces of the sides of the body 1 to space said disks from said surfaces. The knives 7 of each disk 6 are relatively spaced, and the knives of the respective disks are out of axial alinement and extend below the lower edges of the sides of the body 1.

A guard 13 is positioned at the bottom of the body 1 and is made of resilient metal. It is of arcuate formation and includes strips 14 which are positioned between the disks 6 inwardly beyond the knives 7. Barrels 15 are carried by one end of the guard 13 and embrace one of the spacing sleeves 4 whereby to pivotally connect the guard to the body 1. The other end of the guard 13 is provided with a lug or extension 16 which is adapted to be engaged by a latch 17 secured to the body 1 by one of the bolts 3 and the spacing sleeves 4 mounted on said bolt. The guard 13 is thus pivotally connected to one and detachably connected to the other end of the body 1. The latch 17 is of angular formation and is secured in place through the medium of its member 18. The member 19 of the latch 17 extends across the body 1 and is provided in its upper edge with a notch 20 for the reception of the lug or projection 16 on the guard 13.

In practice, the device is grasped by the body 1 and is moved over the meat or steak which it is desired to make tender. The knives 7 penetrate meat or steak and due thereto produce the desired results. The guard 13 and bottom edges of the sides of the body 1 prevent the knives 7 from carrying the meat or steak within the body. The cutter 5 is mounted for free rotation, and it may be removed from the body 1 by swinging the guard 13 outwardly with respect to the body and by removing the bolt 6. With the guard in opened position, and the cutter 5 removed from the body 1, the device may be easily and quickly cleaned. The latch 17 is made of resilient metal, the member 19 thereof may be readily moved out of engagement with the extension or lug 16 when it is desired to free the guard 13 for movement into opened position.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. A meat tenderer comprising a hollow body, a cutter rotatably supported within the body and provided with radial knives, a guard pivoted at one end to the body, and means detachably connecting the other end of the guard to the body.

2. A meat tenderer comprising a hollow body, a cutter rotatably supported within the body and provided with relatively spaced annular series of radial knives, a guard pivoted at one end to the body and having strips located between the series of knives, and means detachably connecting the other end of the guard to the body.

3. A meat tenderer comprising a hollow body, a cutter rotatably supported within the body and provided with relatively spaced annular series of radial knives, a guard pivoted at one end to the body and having strips located between the series of knives, and means detachably connecting the other end of the guard to the body, said means comprising a lug carried by the guard and a spring latch carried by the body.

In testimony whereof I affix my signature.

EVERT MITCHELL.